Nov. 18, 1947.  T. J. HOPKINS  2,430,984
PORTABLE TOOL
Filed July 28, 1944

INVENTOR.
THOMAS J. HOPKINS
BY Charles R. Fay
atty.

Patented Nov. 18, 1947

2,430,984

UNITED STATES PATENT OFFICE 2,430,984

PORTABLE TOOL

Thomas J. Hopkins, Fitchburg, Mass.

Application July 28, 1944, Serial No. 547,042

1 Claim. (Cl. 51—166.)

This invention relates to a portable tool adapted to be mounted on a support such as a vise and used in stationary position thereon.

Objects of the invention include the provision of a lightweight portable base for supporting a motor hand tool of the lightweight inexpensive type universally found on the market, said base including means for entering into a clamp or vise so that the motor tool may be held in rigid position thereon, said base having a rod depending therefrom below the motor, there being a swingable arm on the rod and a work table or plate on the arm disposed adjacent a tool on the motor shaft whereby the arm may be pivoted back and forth under the tool and a piece held to the work table or plate may be operated upon by the tool, thus enabling the operator to file or grind small parts such as cutters or reamers to sharpen the same, it being understood however that many other types of work may be done on this device, the tool being particularly adapted for the flat cleaning or grinding of magneto points.

Further objects of the invention include the provision of a tool as aforesaid wherein the rod is partially screw threaded for the reception of a locking device such as a nut for supporting the arm, there being a compression spring located on the rod between the arm and the base so as to hold the arm in a relatively fixed position vertically while still allowing the same to be swung in working cooperation with the motor tool; and the provision of a work holder or plate mounted at the free end of the arm in adjustable relation vertically and rotatably in a horizontal plane relative to the tool; and the provision of a clamping means for securing the arm to the rod in fixed relation, the work table being swingable under the tool.

Other objects and advantages of the invention will appear hereinafter.

Reference is to be had to the accompanying drawings, in which

The subject matter of the present invention is particularly adapted for light work such as the accomplishment of the usual hand filing job by power means, it being well recognized that no matter how careful an operator is, it is impossible to file exactly flat by hand, and the present invention discloses a lightweight inexpensive device which is capable of doing such work by power means and at the same time achieving a completely flat filed or ground surface.

Figure 1:
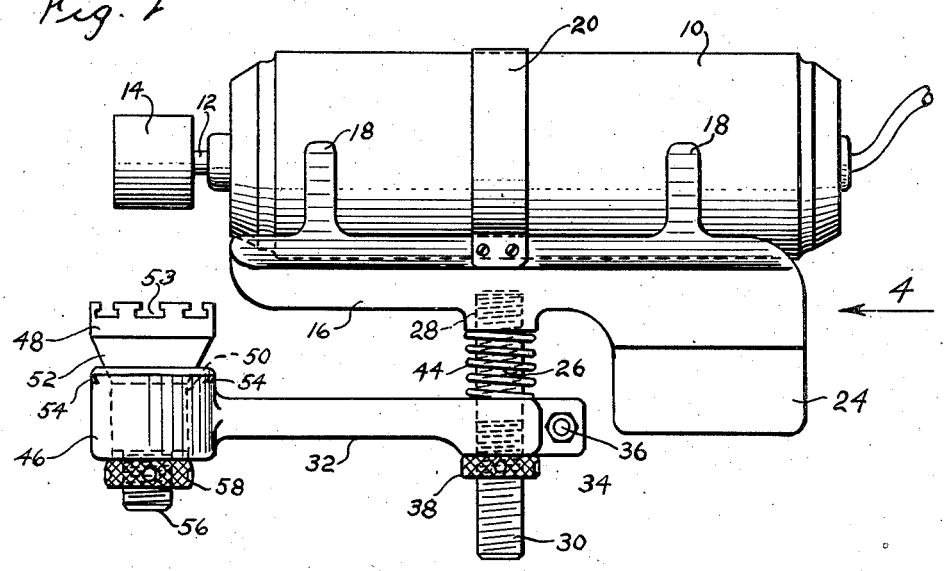
Fig. 1 is a view in elevation showing a form of my invention.

In Fig. 1 there is shown a motor 10 which may be of the small light hand manipulated type universally used for light work. This motor is provided with a drive shaft 12 having a tool of any kind desired thereon as indicated by a cylindrical grinding tool 14. It is to be understood that any kind of tool capable of being driven by the motor specified may be used instead of the tool 14 shown.

I provide a base 16 having a top surface conforming to the general outline of motor 10 and provided with fingers 18 which act as guides for any make of hand tool of the type described. A strap 20 having an adjustable clamp connection 22 may be used so as to enable the base 16 to carry any usual size of small motor. Base 16 is provided with a tang 24 which extends oppositely from the motor 10 and may be set in a vise or any other clamping means for holding the entire device in a fixed position.

Depending from base 16 oppositely from motor 10 I provide a rod 26 which is connected at one end to the base as shown at 28 and which is screw threaded at its other end as at 30. An arm 32 is mounted on rod 26 to slide vertically thereon without engagement with screw threads 30 and this rod is provided at one end with ears 34 connected by a bolt 36 for the purpose of rigidly clamping the arm to the rod when it is desired to fix the arm immovably to the rod. A locking nut 38 engages screw threads 30 for vertical adjustment on rod 26; and a compression spring 40 surrounding the rod, bears against a boss on base 16 and against the upper side of arm 32 to maintain the latter in its vertically adjustable position but still allowing the same to swing in a horizontal plane.

Arm 32 extends outwardly toward the shaft 12 and is parallel thereto and to the motor, the arm is provided at its free end with a hollow boss 46 which may be integral therewith and which is adapted to receive and mount different types of work holders or plates 48. The boss 46 may be tapered as at 50 to conform to a taper 52 on the work table so that the latter will tend to always seek a level position to provide for parallelism between shaft 12 and the holding surface of the work plate. The latter may, if desired, be provided with T-slots 53 for the reception of bolts for jigs. Boss 46 may be provided with parallel recesses 54 for the reception of a sliding work holder if desired. The work holder is provided with a depending screw threaded portion 56 receiving a nut 58 to clamp the work holder in place.

Figure 2:
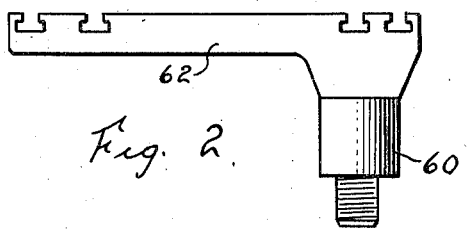
Fig. 2 is a view in side elevation showing a modified work holder.
Figure 3:
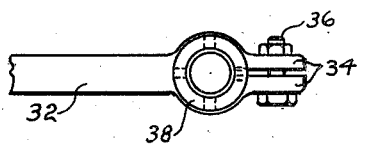
Fig. 3 is a bottom plan view of one end of the arm.
Figure 4:
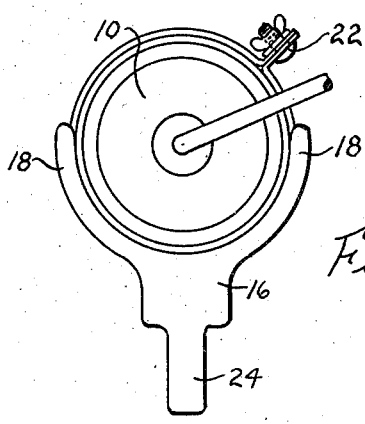
Fig. 4 is a view in end elevation of the device of Fig. 1 looking in the direction of arrow 4.

In Fig. 2 I have shown a modified type of work holder having a depending cylindrical portion 60 which is located in off-center relation to an arm 62, and this work holder may be used when it is desired to clamp arm 32 to the rod 26 as above described, in which case nut 58 may be slightly loosened to allow the arm 62 to be swung in a horizontal plane under the tool 14.

The device as above described will be seen to provide a convenient tool which may be clamped to a work bench although it is portable and which has associated therewith a swinging arm having work plates cooperating with the motor tool for flat surface grinding or for other uses as desired. The arm is vertically adjustable so as to vary the distance between the tool and the work holder and the latter may be tight or loose according to the work being done. When desired or convenient the motor 10 may be quickly detached from its base and used for other types of work and particularly for manual portable use as contemplated.

Having thus described my invention and the advantages thereof, I do not wish to be limited to the details herein disclosed, otherwise than as set forth in the claim, but what I claim is:

A portable power tool comprising a portable base, a detachable motor thereon, a motor shaft extended at one end of the motor, a threaded rod depending from the base below the motor at right angles to the motor shaft, an arm freely swingable on the rod, a nut threaded on the rod for adjustably holding the arm to the rod, a coil spring on the rod, said spring being compressed between the base and the arm to positively locate the latter against said nut, an adjustable work holder on the arm, said work holder being swingable against the frictional force of the spring on an arc under the extension of the motor shaft in a plane parallel to the motor shaft so that flat surface working may be accomplished.

THOMAS J. HOPKINS.

REFERENCES CITED

The following references are of record in the file of this patent:

UNITED STATES PATENTS

| Number | Name | Date |
| --- | --- | --- |
| 1,113,650 | Kelsey | Oct. 13, 1914 |
| 809,822 | Lawton | Jan. 9, 1906 |
| 712,537 | Hisey | Nov. 4, 1902 |
| 101,559 | Worrall | Apr. 5, 1870 |
| 261,848 | Hadley | Aug. 1, 1882 |
| 979,880 | Olds | Dec. 27, 1910 |
| Re. 13,628 | Sweet | Oct. 14, 1913 |
| 1,493,630 | Harner et al. | May 13, 1924 |
| 1,961,328 | Beach | June 5, 1934 |
| 2,146,355 | Schick | Feb. 7, 1939 |
| 2,321,081 | Hanrahan | June 8, 1943 |